United States Patent
Rahman

(10) Patent No.: US 10,812,535 B2
(45) Date of Patent: *Oct. 20, 2020

(54) TIMER MANAGEMENT FOR SESSION INITIATION PROTOCOL

(71) Applicant: T-Mobile USA, Inc., Bellevue, WA (US)

(72) Inventor: Muhammad Tawhidur Rahman, Bellevue, WA (US)

(73) Assignee: T-Mobile USA, Inc., Bellevue, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/366,423

(22) Filed: Mar. 27, 2019

(65) Prior Publication Data

US 2019/0222614 A1 Jul. 18, 2019

Related U.S. Application Data

(63) Continuation of application No. 15/297,018, filed on Oct. 18, 2016, now Pat. No. 10,291,659.

(51) Int. Cl.
 *H04L 12/28* (2006.01)
 *H04L 29/06* (2006.01)
 *H04L 12/26* (2006.01)

(52) U.S. Cl.
 CPC ...... *H04L 65/1016* (2013.01); *H04L 43/0864* (2013.01); *H04L 65/1006* (2013.01); *H04L 43/08* (2013.01)

(58) Field of Classification Search
 CPC ............. H04L 65/1016; H04L 43/0864; H04L 65/1006
 See application file for complete search history.

(56) References Cited

U.S. PATENT DOCUMENTS

| | | | |
|---|---|---|---|
| 7,349,690 B2 * | 3/2008 | Abdel-Kader | H04L 29/06027 370/352 |
| 2003/0212912 A1 * | 11/2003 | Bajko | H04L 63/108 726/14 |
| 2005/0190772 A1 | 9/2005 | Tsai | |
| 2005/0265382 A1 * | 12/2005 | Hartikainen | H04L 67/04 370/465 |
| 2006/0112425 A1 * | 5/2006 | Smith | H04L 63/20 726/13 |
| 2006/0146792 A1 | 7/2006 | Ramachandran | |
| 2007/0274289 A1 | 11/2007 | Buckley | |
| 2009/0310484 A1 * | 12/2009 | Sisalem | H04L 12/66 370/230 |
| 2010/0070563 A1 * | 3/2010 | Baker | H04L 65/1046 709/203 |
| 2010/0150014 A1 | 6/2010 | Oda | |
| 2010/0223492 A1 | 9/2010 | Farrugia | |
| 2012/0033798 A1 | 2/2012 | Eardley | |

(Continued)

*Primary Examiner* — Lan-Huong Truong
(74) *Attorney, Agent, or Firm* — Knobbe Martens Olson & Bear LLP

(57) ABSTRACT

Systems and methods for managing timers for Session Initiation Protocol (SIP) that facilitates network communications in an IP Multimedia Subsystem (IMS) are disclosed. Based on monitored network traffic, network performance measures can be determined to form a basis for dynamic configuration of SIP timers, which may reflect real time network status and optimize SIP based network communication.

20 Claims, 4 Drawing Sheets

(56) References Cited

U.S. PATENT DOCUMENTS

| | | |
|---|---|---|
| 2013/0019025 A1* | 1/2013 | Chaturvedi ....... H04L 29/06517 709/231 |
| 2014/0364118 A1 | 12/2014 | Belghoul |
| 2015/0026793 A1 | 1/2015 | Li |
| 2015/0244874 A1 | 8/2015 | Tornkvist |
| 2016/0174110 A1 | 6/2016 | Sharma |
| 2017/0181215 A1 | 6/2017 | Gaur |

* cited by examiner

TIMER MANAGEMENT FOR SESSION INITIATION PROTOCOL

CROSS-REFERENCE TO RELATED APPLICATIONS

This application is a continuation of U.S. patent application Ser. No. 15/297,018 entitled TIMER MANAGEMENT FOR SESSION INITIATION PROTOCOL, and filed on Oct. 18, 2016, the entirety of which is incorporated by reference herein.

BACKGROUND

Generally described, computing devices can be used to exchange data via a communication network. In one embodiment, mobile computing devices utilize a wireless communication network provided by a wireless service provider to facilitate the exchange of information in accordance with one or more wireless communication protocols. For example, a wireless service provider can maintain a wireless communication network in which a set of mobile devices are configured to exchange information in accordance with a second generation wireless communication protocol, such as the Global System for Mobile Communication wireless communication protocol (e.g., GSM). In another example, the wireless service provider can also maintain another wireless communication network in which mobile devices are configured to exchange information in accordance with a third generation or fourth generation wireless communication protocol such as the Wideband Code Division Multiple Access ("WCDMA") or Long Term Evolution ("LTE") wireless communication protocols.

Through advancements in wireless access technologies, Internet Protocol (IP) based communications for multimedia applications became available for various types of mobile devices. Examples of such applications include white board discussions, video conferencing, Push to talk over Cellular (PoC), Voice over IP, real-time content sharing including videos/audio files, instant messaging, interactive gaming, and the like. An architectural framework for delivering Internet Protocol (IP) multimedia to mobile users over various types of wireless and fixed networks to provide the same level of standardization is called the IP Multimedia Subsystem (IMS). Many implementations of IMS employ Session Initiation Protocol (SIP) for signaling and controlling multimedia communication sessions, including, for example, to establish, modify, and terminate media sessions for various applications. Different SIP timers control the retries, time-outs, or other temporal aspects of communications among various nodes implementing IMS functionalities in accordance with the Session Initiation Protocol.

BRIEF DESCRIPTION OF THE DRAWINGS

Throughout the drawings, reference numbers may be re-used to indicate correspondence between referenced elements. The drawings are provided to illustrate example embodiments described herein and are not intended to limit the scope of the disclosure.

DETAILED DESCRIPTION

Figure 1:
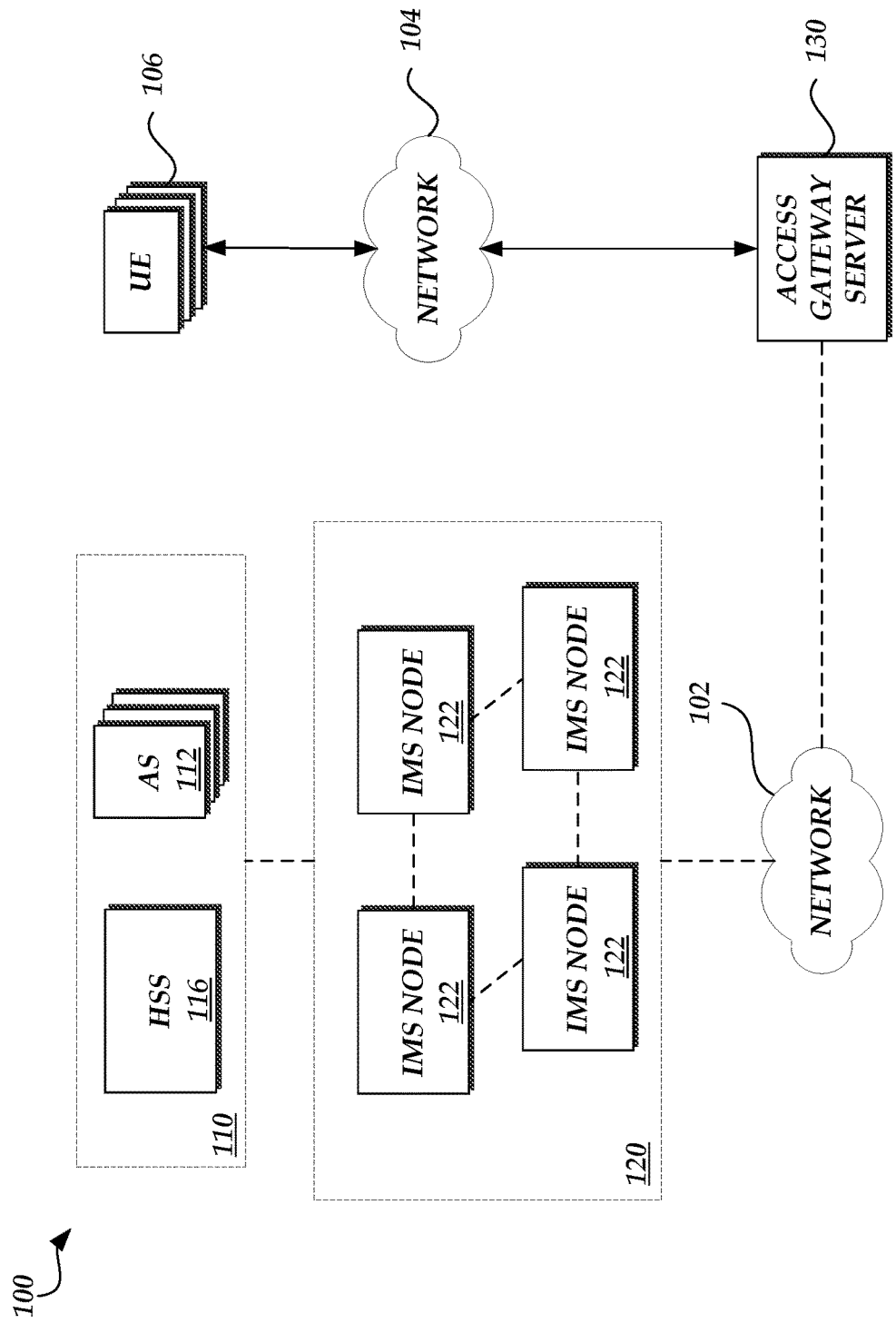
FIG. 1 is a block diagram of an exemplary IMS network environment that includes IMS nodes and user devices.

Generally described, aspects of the present disclosure are directed to the management of timers for Session Initiation Protocol (SIP) that facilitates network communications in an IP Multimedia Subsystem (IMS). In some aspects, SIP timers govern the logic on how often IMS nodes (e.g., I-CSCF, TAS, S-CSCF, P-CSCF, Presence Server, or RMS) attempt to retry communications (as needed when first request fails) for critical IMS signaling messages. In other aspects, SIP timers also govern the logic on how long an IMS node will declare a time-out in network communication. As such, the amount of traffic for retries for different SIP signaling transactions (e.g., INVITE, REGISTER, SUBSCRIBER, NOTIFY, MESSAGE, or ACK) are closely associated with the setting of SIP timers. The general operation of SIP timers are prescribed in Request for Comments (RFC) 3261 of The Internet Engineering Task Force (IETF), the entirety of which is incorporated herein by reference.

Typically, SIP timers are set by an operator or administrator of the IMS network to certain pre-configured static values. However, given the size of network, the number of network nodes, the topology of network connections, and the dynamic nature of network traffic involved, statically configured SIP timers may cause suboptimal performance or even detrimental effects on the IMS. For example, non-optimal settings of SIP timers can flood the IMS nodes with extra signaling and lead to an outage. The present disclosure provides systems and methods for dynamic SIP timer settings based on real-time or predicted network status in the IMS. By adopting this dynamic approach for SIP timer settings, improved or optimal signaling for user device and IMS network interaction can be ensured, which may be invoked in every IMS transaction for services such as Voice over Long-Term Evolution (VoLTE), Video over Long-Term Evolution (ViLTE), Rich Communications Services (RCS), Voice over Wi-Fi (VoWifi), or the like. Therefore, by dynamically adjusting applicable SIP timers, IMS network signaling may become resilient to real time dynamics in the overall network and may be self-tuned in response to various network scenarios.

In an illustrative embodiment, individual IMS nodes monitor SIP related network communications. The IMS nodes may monitor the SIP related network communications on a periodic basis or alternatively on at least a semi-continuous basis. Illustratively, the IMS node may monitor and record the timing, origin, destination, type, or other characteristics associated with any SIP message that is sent, forwarded, received, or otherwise traveled through the IMS node. Alternatively or in addition, the IMS node may obtain transport layer network characteristics (e.g., Round Trip Time (RTT) in accordance with Transmission Control Protocol (TCP) or User Datagram Protocol (UDP)) corresponding to the SIP messages. The IMS node then determines network performance measure(s) that may serve as the basis for SIP timer settings. Illustratively, the IMS node may aggregate or otherwise analyze the monitored data of network communication over a most recent period of time (e.g., 15-minutes) to generate various network performance statistics, such as average RTT, latency, bandwidth, throughput, jitter, error rate, or the like.

The IMS node further determines settings for various SIP timers based on the network performance measure(s). For example, certain SIP timer can be set to a multiple of the average RTT, which may be further weighted or offset by one or more other network performance factors, such as jitter or error rate. In some embodiments, different IMS nodes may determine different SIP timer settings in accordance with the network performance measures determined by individual IMS nodes. In other embodiments, the network performance measure(s) can be determined by a system or service associated with multiple IMS nodes, thus serving as the basis for SIP timer setting for all the associated IMS nodes. Once SIP timer settings are determined, individual IMS node applies the SIP timer settings locally, for example, by making appropriate changes to one or more SIP configuration files. By repeating this process at some predetermined frequency, SIP timers may be updated to adapt to most recent network status, which allows SIP traffic to be optimized in the IMS.

Although described with reference to an IMS network, elements of the present disclosure are not limited to the embodiment so illustrated. For example, the systems, methods, and functionalities disclosed herein may be used to analyze any network utilizing SIP for communications on the network. As another example, although the term user device or user equipment (UE) is used in this document, the term represents any type of device having a component for communicating with one or more other devices via one or more communication paths. Such communication paths can include wireless communication paths (via infra-red, RF, optical, terrestrial, or satellite communication media) and wired communication paths. Still further, although the present disclosure is described with regard to specific methodologies and frameworks for network monitoring, network performance determination, SIP timer setting and application, the present disclosure should not be construed to require combination of the disclosed embodiments or any specific variation unless such combination or variation is expressly identified.

FIG. 1 is a block diagram of an exemplary IMS network environment 100 that includes IMS nodes 122 and user devices 106. The IMS network environment 100 includes an Application/Service Layer 110, an IMS Layer 120, and one or more access gateway servers 130. The IMS network environment 100 further includes one or more networks 102, 104 such as an IP multimedia and telephony core network, as generally defined by 3GPP and 3GPP2 standards and organizations based on IETF Internet protocols.

As shown in FIG. 1, the Application/Service Layer 110 includes a home subscriber server (HSS) 116, one or more application service (AS) servers 112 and the like. In one embodiment, the HSS 116 may be a central repository/database that contains subscriber- or user-specific data, including, but not limited to, user authorizations, service permissions, user profiles, user preferences, etc. The HSS 116 may be configured to integrate several functions/elements, including authentication and authorization, and the like. The AS servers 112 may host and execute services through the IMS layer 120 using a Session Initiation Protocol (SIP).

The IMS layer 120 includes several types of IMS nodes 122. In general, the IMS layer 120 carries out the primary SIP signaling functions in the IMS network environment 100. As discussed above, the IMS nodes may include one or more Proxy-CSCFs (P-CSCFs), Interrogating-CSCFs (I-CSCFs), Serving-CSCFs (S-CSCFs), Telephony Application Servers (TAS's), Presence Servers, Rich Messaging Servers (RMS's), or the like. By way of an exemplary series of SIP signaling transactions, when a user, via a user device, initiates a call request, a P-CSCF node is at the entry point of a network (visitor or home network) where the call request is received from the user device. Upon receipt of a request to a call connection, the P-CSCF node, in turn, sends a call signaling to an I-CSCF node of the home network, which determines an S-CSCF node responsible for delivering the services to the user device. Generally stated, the I-CSCF node learns the identity of a proper S-CSCF node by communicating with the HSS 116. The S-CSCF node executes comprehensive call control based on the services of the user (calling party) and the called party. The S-CSCF node may extract the service information of the user from the HSS 116, which defines the trigger points (TP) of services and pointers to SIP Application Servers (such as AS 112 depicted in FIG. 1) where the specific application (service) logic resides. As discussed above, various SIP timers control or otherwise affect this exemplary series of SIP signaling transactions.

From a functional perspective, the IMS layer 120 provides a horizontal control layer that isolates the access network from the Application/Service layer 120. Generally, the Application/Service layer 110 does not need to have its own control functions, as the IMS layer 120 is used for providing control functions. This allows easier integration and deployment of services or modifications on the IMS infrastructure. Illustratively, individual IMS nodes 122 may be configured to execute computer-executable code to implement various methods or processes disclosed herein, such as network communication monitoring, network performance determination, SIP timer setting determination, SIP timer application, or the like.

In some embodiments, the IMS network environment 100 comprises one or more networks that may correspond to a number of IP-based and other networks such as the Internet, DSL networks, public switched telephone networks ("PSTN") and other wire-line networks (e.g., SS7-based networks), wireless networks such as those using CDMA, GSM, IEEE 802.11x, and/or UMTS communications or the like, and local area networks. For example, an IP-core network 102 is interfaced with other networks 104 through an access gateway server 130. In one embodiment, an access gateway server 130 may include a Gateway GPRS Support Node (GGSN) for General Packet Radio Service (GPRS), a Packet Data Gateway (PDG) for WiFi, Systems Architecture Evolution Gateway (SAE-GW) or a Packet Data Network Gateway (PDN-GW) for 3GPP Long Term Evolution (LTE), or the like.

In the IMS network environment 100, the user devices or User Equipments (UEs) 106 may be electronic devices capable of communicating with one another over the network(s) in the IMS network environment 100. In some embodiments, the user devices 106 may include computing devices, wire-line connected communication devices such as conventional telephones and enhanced/multimedia-capable telephones, wireless devices such as mobile phones, wireless PDA's, wireless devices with high-speed data transfer capabilities, such as those compliant with "3G," "4G" or "LTE" standards, and the like. As will be well appreciated, the computing/communication devices may include a variety of configurations or forms such as, but not limited to, laptop or tablet computers, personal digital assistants (PDAs), hybrid PDA/mobile phones, mobile phones, smart phones, media players, home messaging hub devices, digital picture frame devices, or the like.

Further, as will be appreciated by one skilled in the art, the user devices 106 communicate with one another over the networks in a standard manner, depending on the particular networks used and the particular type of terminals. Each user device may cover communications frequency bands such as the cellular telephone bands at 850 MHz, 900 MHz, 1800 MHz, and 1900 MHz, the global positioning system (GPS) band, data service bands such as the 3G data communications band (e.g., the Universal Mobile Telecommunications System (UMTS) communication band), the WiFi® (IEEE 802.11) band, the Bluetooth® band and the like. In some embodiments, the user device may include several circuitries that are required to support one or more of following: the General Packet Radio Service (GPRS) standard, Enhanced Digital GSM Evolution (EDGE), or Evolution of GSM (E-GSM) standard, Code Division Multiple Access (CDMA) standard, Wideband Code Division Multiple Access (WCDMA or W-CDMA) standard, Orthogonal Frequency Division Multiplex (OFDM) standard, Time Division Multiple Access (TDMA) standard, and the other standards.

Figure 2:
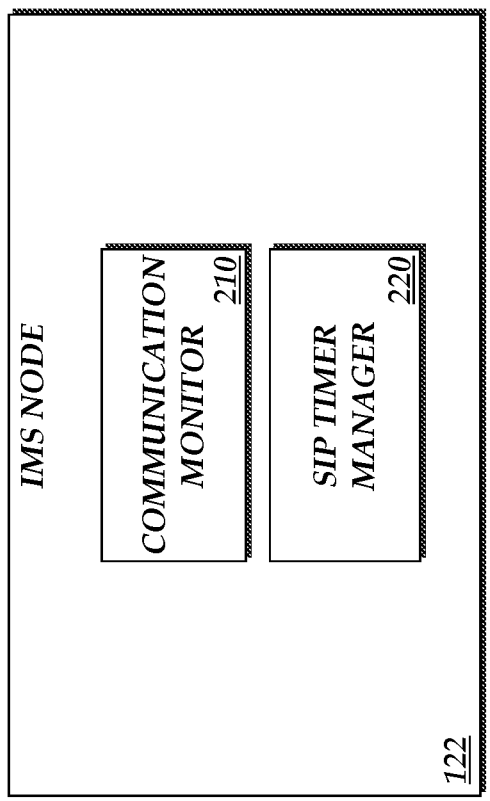
FIG. 2 is a block diagram of exemplary components of an IMS node in the IMS network environment of FIG. 1.

FIG. 2 is a block diagram of exemplary components of an IMS node 122 in the IMS network environment 100 of FIG. 1. Individual IMS nodes 122 may correspond to a networked computing device (e.g., a server) or a group of interconnected computing devices. In some embodiments, a same computing device may implement at least some functionalities of different IMS nodes 122. In other embodiments, IMS nodes 122 may be implemented on one or more virtual machines that are hosted on one or more computing devices.

Among other things, an IMS node 122 may include a communication monitor 210 and a SIP timer manager 220. Illustratively, the communication monitor 210 can be configured to monitor SIP based network communications that originate, relay, pass-through, or end at the IMS node 122. The communication monitor 210 may constantly update one or more log files or databases to keep track of various characteristics, measurements, or other attributes on different network layers related to any SIP based network communications. In some embodiments, the communication monitor 210 may further aggregate the monitored data to produce various statistics of network performance for use by the SIP timer manager 220.

Illustratively, the SIP timer manager 220 can be configured to analyze the data generated by the communication monitor 210 and to determine appropriate value settings for various SIP timers. For example, SIP timer values can be a multiple of a measured or estimated RTT value, which may be further weighted or offset by one or more other network performance factors, such as jitter or error rate. In some embodiments, different IMS nodes 122 each may have a separate SIP timer manager 220 specifically managing SIP timers for the IMS node. In other embodiments, a group of IMS nodes 122 may share a same SIP timer manager 220 (e.g., implemented on a dedicated IMS node 122 or one or more separate computing devices) that collects and analyzes data from multiple communication monitors 210 and determines proper SIP timer settings for multiple IMS nodes 122 within the group. The SIP timer manager 220 may further make changes to one or more SIP configuration files on an associated IMS node 122 to apply the new SIP timer settings.

Figure 3:
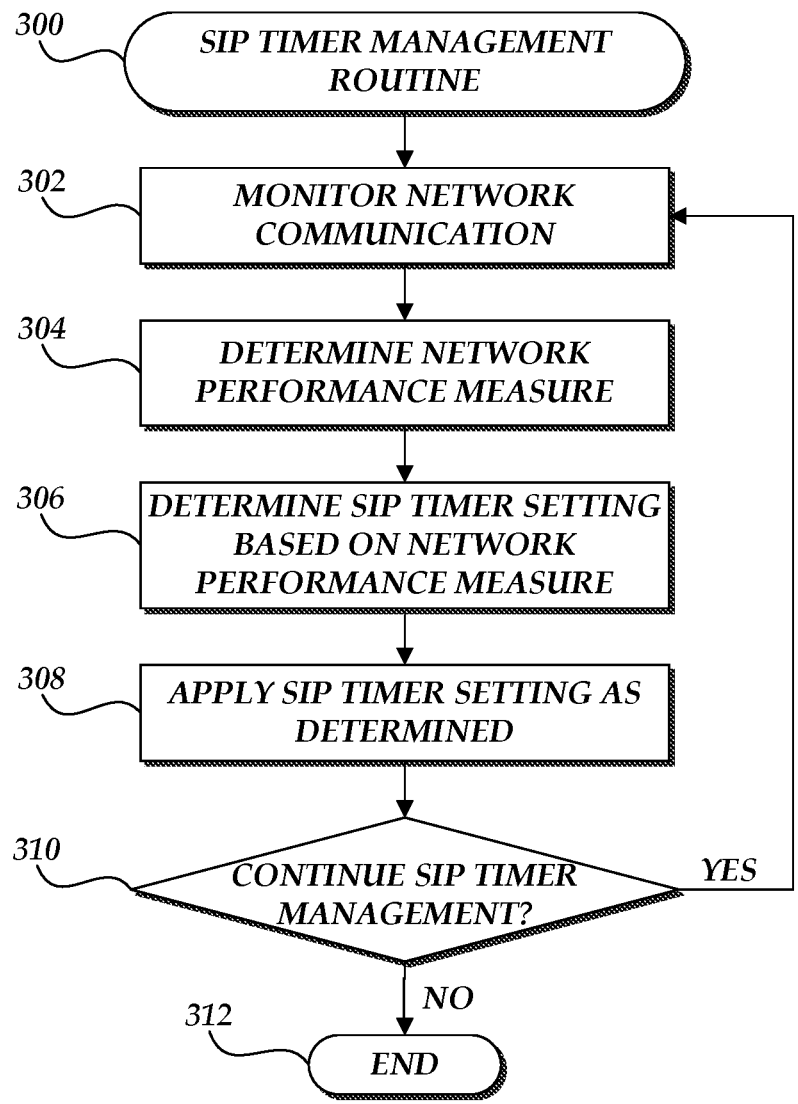
FIG. 3 is a flow diagram depicting a SIP timer management routine illustratively implemented by an IMS node in the IMS network environment of FIG. 1.

FIG. 3 is a flow diagram depicting a SIP timer management routine 300 illustratively implemented by an IMS node 122 in the IMS network environment 100 of FIG. 1. At block 302, the IMS node 122 monitors network communication that originates, passes through, relays, or ends at the IMS node 122. In some embodiments, the IMS node 122 monitors network traffic related to SIP message transmissions on different layers of the network (e.g., the IMS layer, the transport layer, or the like). In other embodiments, the IMS node 122 monitors network traffic related to non-SIP transactions as well. Illustratively, the IMS node 122 may record information such as time stamps upon receipt or transmission of a message, the type, length, or other characteristics of a message, the origin, destination, or other network path information of a message, or the like. Such monitored network traffic data may be stored locally at the IMS node 122, or, remotely at a database associated with one or more IMS nodes 122.

At block 304, the IMS node 122 may determine various network performance measures based on the monitored network traffic data. Illustratively, the IMS node 122 may track each SIP message on the SIP layer that is transmitted from the IMS node 122 over a defined recent period of time (e.g., most recent hour). The IMS node 122 may determine a duration of time (hereinafter "SIP transaction time") that the IMS node 122 needs to wait before receiving an acknowledgement or other handshake message from a peer node in response to a SIP message transmitted by the IMS node 122. Alternatively or in addition, the IMS node 122 may track each data packet on the transport layer that is related to SIP messages transmitted from the IMS node 122 over a defined recent period of time (e.g., most recent 10 minutes), and determine a corresponding RTT for the data packet. In some embodiments, the IMS node 122 may determine RTTs by pinging peer nodes via transport layer protocols (e.g., Internet Control Message Protocol (ICMP) or the like). The SIP transaction times or RTT's can be aggregated, averaged, weighted, or otherwise modified mathematically to serve as a basis for SIP timer settings. As discussed above, the IMS node 122 may further determine the latency, bandwidth, throughput, jitter, error rate, or other network performance measures by aggregating or otherwise analyzing the monitored network traffic data.

At block 306, the IMS node 122 determines SIP timer settings based on the network performance measures as determined at block 304. Depending on the type of the IMS node 122 and the functionalities performed, settings for different SIP timer(s) (e.g., Timers A-K as indicated in IETF RFC 3261, Page 264) may be determined based on different criteria or formulae. For example, certain SIP timer values can be a multiple of a measured or estimated RTT value, which may be further weighted or offset by one or more other network performance factors, such as jitter or error rate. As another example, certain SIP timer values can be a maximum SIP transaction time over a defined period of time (e.g., the most recent 24 hours) plus a cushion time, which may be further weighted or offset by one or more other network performance factors, such as jitter or error rate.

In some embodiment, a group of IMS nodes 122 may determine SIP timer settings in a collective way. For example, each IMS node 122 may transmit locally determined network performance measures to a shared management service, which may determine a collective basis (e.g., a collective RTT or SIP transaction time) for SIP timer setting by weighting and combining the network performance measures associated with different IMS nodes 122. The shared management service may return the collective basis to individual IMS nodes 122, who may then determine SIP timer settings based thereon.

At block 308, the IMS node 122 applies one or more SIP timer settings as determined. Illustratively, the IMS node 122 may modify or otherwise update one or more SIP configuration files to change applicable SIP timer settings. After the SIP configuration files are updated properly, the IMS node 122 may force or otherwise trigger reloading of local SIP controlling logic. In some embodiments, the IMS node 122 may initiate a restart or reboot of some SIP related services. In some embodiments, the IMS node 122 may limit the application of the new SIP timer settings to a specified period of time (e.g., the next 12 hours).

At block 310, the IMS node 122 determines whether SIP timer management should continue. In some embodiments, the IMS node 122 may determine whether a certain level of network performance has been reached or whether the IMS node 122 currently has sufficient computing resources for continued SIP timer management. If the IMS node 122 determines to continue SIP timer management, the routine 300 proceeds to block 302. Otherwise, the routine 300 ends at block 312. In some embodiment, the routine 300 is implemented periodically (e.g., hourly or daily) with or without regard to assessment of network performance.

Figure 4:
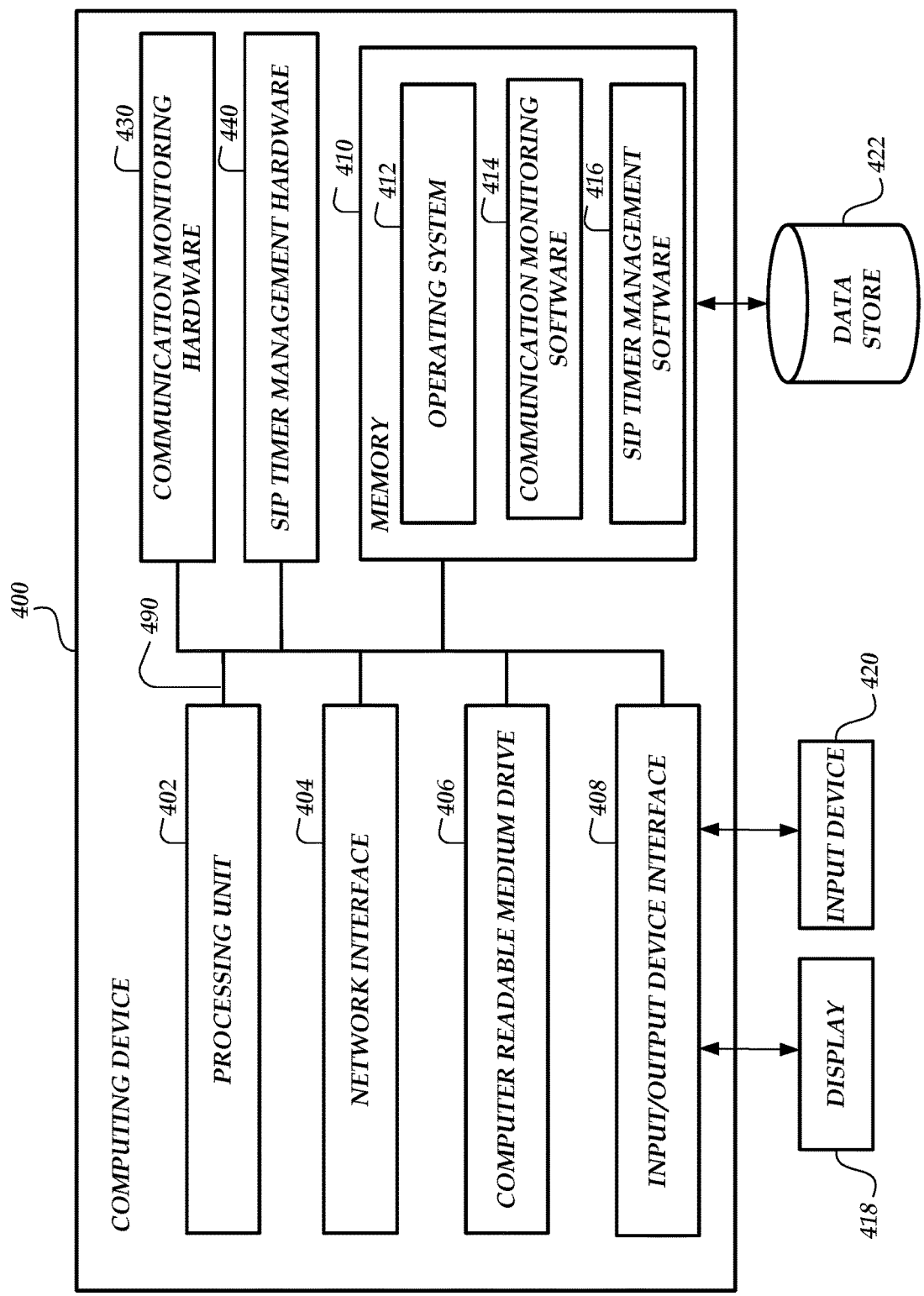
FIG. 4 is an illustrative functional block diagram of a computing device for management of SIP timer.

FIG. 4 is an illustrative functional block diagram of a computing device for management of SIP timer. The computing device 400 can be a server or other computing device, and can comprise a processing unit 402, a network interface 404, a computer readable medium drive 406, an input/output device interface 408, and a memory 410. The network interface 404 can provide connectivity to one or more networks (e.g., the network 102) or computing systems. The processing unit 402 can receive information and instructions from other computing systems or services via the network interface 404. The network interface 404 can also store data directly to memory 410. The processing unit 402 can communicate to and from memory 410 and output information to an optional display 418 via the input/output device interface 408. The input/output device interface 408 can also accept input from the optional input device 420, such as a keyboard, mouse, digital pen, microphone, mass storage device, etc.

The memory 410 contains computer program instructions that the processing unit 402 executes in order to implement one or more embodiments. The memory 410 generally includes RAM, ROM, and/or other persistent, non-transitory computer readable media. The memory 410 can store an operating system 412 that provides computer program instructions for use by the processing unit 402 or other elements included in the computing device in the general administration and operation of the computing device 400. The memory 410 can further include computer program instructions and other information for implementing aspects of the present disclosure. For example, in one embodiment, the memory 410 includes communication monitoring software 414 and SIP timer management software 416 that implements aspects of the present disclosure. The communication monitoring software 414 may illustratively correspond to all or some of the components of the communication monitor 210 depicted in FIG. 2, or to implement some portion of the illustrative routine 300 of FIG. 3. The SIP timer management software 416 may illustratively correspond to all or some of the components of the SIP manager 220 depicted in FIG. 2, or to implement some portion of the illustrative routine 300 of FIG. 3.

The computing device 400 may further comprise communication monitoring hardware 430 and SIP timer management hardware 440. The communication monitoring hardware 430 and the SIP timer management hardware 440 may illustratively implement aspects of the present disclosure, such as components of the communication monitor 210 and SIP manager 220 depicted in FIG. 2, or relevant portions of the illustrative routine 300 of FIG. 3, respectively. In some embodiments, the communication monitoring hardware 430 and SIP timer management hardware 440 may be implemented in part with the processing unit 402, the computer readable medium drive 406, or other elements of the computing device 400.

The elements included in the computing device 400 may be coupled by a bus 490. The bus 490 may be a data bus, communication bus, or other bus mechanism to enable the various components of the computing device 400 to exchange information. In some embodiments, the computing device 400 may include additional or fewer components than are shown in FIG. 4. For example, a computing device 400 may include more than one processing unit 402 and computer readable medium drive 406. In another example, the computing device 400 may not be coupled to a display 418 or an input device 420. In still another example, the communication monitoring software 414, SIP timer management software 416, the communication monitoring hardware 430, or the SIP timer management hardware 440 may include various interdependent or independent subcomponents implementing different aspects of the present disclosure. In some embodiments, two or more computing devices 400 may together form a computer system for executing features of the present disclosure.

Depending on the embodiment, certain acts, events, or functions of any of the methods described herein can be performed in a different sequence, can be added, merged, or left out altogether (e.g., not all described acts or events are necessary for the practice of the algorithm). Moreover, in certain embodiments, acts or events can be performed concurrently, e.g., through multi-threaded processing, interrupt processing, or multiple processors or processor cores or on other parallel architectures, rather than sequentially.

The various illustrative logical blocks, modules and method elements described in connection with the embodiments disclosed herein can be implemented as electronic hardware (e.g., application-specific logic circuitry), computer software executed by hardware, or combinations of both. To clearly illustrate this interchangeability of hardware and software, various illustrative components, blocks, modules, and steps have been described above generally in terms of their functionality. Whether such functionality is implemented as hardware, or as software executed by hardware, depends upon the particular application and design constraints imposed on the overall system. The described functionality can be implemented in varying ways for each particular application, but such implementation decisions should not be interpreted as causing a departure from the scope of the disclosure.

The various illustrative logical blocks and modules described in connection with the embodiments disclosed herein can be implemented or performed by a computing device, such as a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor can be a microprocessor, but in the alternative, the processor can be a controller, microcontroller, or state machine, combinations of the same, or the like. A processor can also be implemented as a combination of computing devices, e.g., a combination of a DSP and a microprocessor, a plurality of microprocessors, one or more microprocessors in conjunction with a DSP core, or any other such configuration.

The elements of a method, process, or algorithm described in connection with the embodiments disclosed herein can be embodied directly in hardware, in a software module executed by a processor, or in a combination of the two. A software module can reside in RAM memory, flash memory, ROM memory, EPROM memory, EEPROM memory, registers, hard disk, a removable disk, a CD-ROM or any other form of computer-readable storage medium known in the art. A storage medium can be coupled to the processor such that the processor can read information from, and write information to, the storage medium. In the alternative, the storage medium can be integral to the processor. The processor and the storage medium can reside in an ASIC. The ASIC can reside in a user terminal. In the alternative, the processor and the storage medium can reside as discrete components in a user terminal.

Conditional language used herein, such as, among others, "can," "might," "may," "e.g.," and the like, unless specifically stated otherwise, or otherwise understood within the context as used, is generally intended to convey that certain embodiments include, while other embodiments do not include, certain features, elements, and/or states. Thus, such conditional language is not generally intended to imply that features, elements and/or states are in any way required for one or more embodiments or that one or more embodiments necessarily include logic for deciding, with or without author input or prompting, whether these features, elements and/or states are included or are to be performed in any particular embodiment. The terms "comprising," "including," "having," "involving," and the like are synonymous and are used inclusively, in an open-ended fashion, and do not exclude additional elements, features, acts, operations and so forth. Also, the term "or" is used in its inclusive sense (and not in its exclusive sense) so that when used, for example, to connect a list of elements, the term "or" means one, some, or all of the elements in the list.

Disjunctive language such as the phrase "at least one of X, Y, or Z," unless specifically stated otherwise, is otherwise understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y or at least one of Z to each be present.

Unless otherwise explicitly stated, articles such as "a" or "an" should generally be interpreted to include one or more described items. Accordingly, phrases such as "a device configured to" are intended to include one or more recited devices. Such one or more recited devices can also be collectively configured to carry out the stated recitations. For example, "a processor configured to carry out recitations A, B, and C" can include a first processor configured to carry out recitation A working in conjunction with a second processor configured to carry out recitations B and C.

While the above detailed description has shown, described, and pointed out novel features as applied to various embodiments, it will be understood that various omissions, substitutions, and changes in the form and details of the devices or algorithms illustrated can be made without departing from the spirit of the disclosure. As will be recognized, certain embodiments described herein can be embodied within a form that does not provide all of the features and benefits set forth herein, as some features can be used or practiced separately from others. All changes which come within the meaning and range of equivalency of the claims are to be embraced within their scope.

What is claimed is:

1. A computer-implemented method comprising:
   monitoring Session Initiation Protocol (SIP) based network traffic that originates from a target node of a plurality of nodes;
   determining at least one network performance measure based at least partly on the monitored SIP based network traffic;
   determining a setting for at least one SIP timer that governs SIP based network communication based at least partly on the at least one network performance measure; and
   applying, by the target node, the setting for the at least one SIP timer toward SIP based network communication that originates from the target node.

2. The computer-implemented method of claim 1, wherein the plurality of nodes are included in an IP Multimedia Subsystem (IMS) and wherein the plurality of nodes includes at least one of a Proxy-CSCF (P-CSCF), Interrogating-CSCF (I-CSCF), Serving-CSCF (S-CSCF), Telephony Application Server (TAS), Presence Server, or Rich Messaging Server (RMS).

3. The computer-implemented method of claim 1, wherein determining at least one network performance measure comprises determining a transport layer Round Trip Time (RTT).

4. The computer-implemented method of claim 3, wherein determining the setting for at least one SIP timer comprises determining the setting for at least one SIP timer based at least partly on a multiple of the RTT.

5. The computer-implemented method of claim 1 further comprising:
   for a different period of time, monitoring SIP based network traffic that originates from the target node;
   determining a new setting for the at least one SIP timer based at least partly on the monitored SIP based network traffic for the different period of time; and
   applying, by the target node, the new setting for the at least one SIP timer toward SIP based network communication that originates from the target node during a subsequent period of time.

6. A non-transitory computer-readable medium storing computer-executable instructions that, when executed by a processor, causes the processor to perform operations comprising:
   determining one or more first network performance measures based at least partly on Session Initiation Protocol (SIP) based network traffic associated with a first IP Multimedia Subsystem (IMS) node;
   configuring at least one SIP timer for SIP based network communication within at least a portion of the IMS based at least partly on the one or more first network performance measures; and
   responsive to configuring the at least one SIP timer, monitoring SIP based network traffic associated with the first IMS node.

7. The non-transitory computer-readable medium of claim 6, wherein determining one or more first network performance measures comprises analyzing network traffic related to SIP message transmissions on one or more network layers.

8. The non-transitory computer-readable medium of claim 7, wherein the one or more network layers includes at least one of a transport layer or IMS layer.

9. The non-transitory computer-readable medium of claim 6, wherein determining one or more first network performance measures comprises determining at least one of latency, bandwidth, throughput, jitter, or error rate.

10. The non-transitory computer-readable medium of claim 6, wherein configuring at least one SIP timer comprises making changes to one or more SIP configuration files associated with the first IMS node.

11. The non-transitory computer-readable medium of claim 6, wherein the operations further comprise determining one or more second network performance measures based on SIP based network traffic associate with a second IMS node.

12. The non-transitory computer-readable medium of claim 11, wherein the operations further comprise deriving a collective basis for SIP timer configuration based on the one or more first network performance measures and the one or more second network performance measures.

13. The non-transitory computer-readable medium of claim 11, wherein configuring at least one SIP timer comprises making changes to one or more SIP configuration files associated with the second IMS node.

14. A system comprising a plurality of computing devices in communication with one another in accordance with Session Initiation Protocol (SIP) via one or more networks, wherein a target computing device of the plurality of computing devices is configured to:
  determining one or more network performance measures based at least partly on SIP based network traffic associated with at least a first portion of the one or more networks;
  determining at least one SIP timer configuration for SIP based network communication based at least partly on the one or more network performance measures; and
  causing SIP based network communication in accordance with the at least one SIP timer configuration within the at least a second portion of the one or more networks.

15. The system of claim 14, wherein the first portion of the one or more networks includes the target computing device.

16. The system of claim 14, wherein the first portion and the second portion of the one or more networks include at least one computing device in common.

17. The system of claim 14, wherein the target computing device is further configured to monitor SIP based network traffic that at least originates, passes through, or ends at the target computing device.

18. The system of claim 14, wherein the target computing device is further configured to monitor non-SIP based network traffic that at least originates, passes through, or ends at the target computing device.

19. The system of claim 14, wherein determining one or more network performance measures comprises pinging another computing device of the plurality of computing devices via a transport layer protocol.

20. The system of claim 19, wherein the transport layer protocol includes Internet Control Message Protocol (ICMP).

* * * * *